United States Patent Office

3,212,901
Patented Oct. 19, 1965

3,212,901
STABILIZED TOCOPHEROL CONCENTRATES
AND PROCESS FOR PREPARING THE SAME
Charles D. Robeson, Rochester, N.Y., assignor to Eastman Kodak Company, Rochester, N.Y., a corporation of New Jersey
No Drawing. Filed June 7, 1961, Ser. No. 115,284
14 Claims. (Cl. 99—2)

This invention relates to vitamins. More particularly, it relates to vitamin E active compositions.

It is customary to fortify animal and poultry feeds with minerals and vitamins, which are considered to be either essential or desirable for proper animal and poultry nutrition. For this purpose animal and poultry feed supplements or fortifiers have been developed. These are mixtures of concentrated forms of minerals and vitamins, which are prepared and marketed for addition in small proportions to the feeds.

One of the vitamins desired in animal and poultry feeds and feed supplements is that commonly referred to as vitamin E. Such is usually furnished by the tocopherols which are well known vitamin E active compounds.

Tocopherols are found in natural fats and oils and particularly in vegetable oils such as, for example, cottonseed oil, soybean oil, safflower oil and the like. When such fats and oils are subjected to conventional deodorizer treatment, that is, blown with an inert gas such as steam, nitrogen and the like under vacuum, a by-product material usually separates from the inert gas in traps, condensers and the like. This by-product material is commonly referred to as deodorizer distillate. It is also termed deodorizer sludge, hot well scum, lighter-than-water scum, clabber stock, condenser oil, deodorizer trap oil, catch basin scum, shell drainings and the like. Invariably tocopherol components of the oil and fat being deodorized are found in deodorizer distillate and often at relatively high concentrations such as, for example, 2–15 weight percent. In this regard deodorizer distillates are rather complex mixtures comprising tocopherols, sterols, tocopherol esters, sterol esters, glycerides, free higher fatty acids (having 14–18 carbon atoms in most cases when derived from vegetable oils) and miscellaneous organic and inorganic materials. It has been reported that a typical deodorizer distillate such as that derived from the steam deodorization of soybean oil contains on a dry basis about 10 weight percent total tocopherol material (includes both free tocopherols and tocopheryl esters), about 20 weight percent sterol material, about 35 weight percent glyceride material, about 25 weight percent free higher fatty acids and about 10 weight percent miscellaneous, apparently innocuous, organic and inorganic materials. The 10 weight percent total tocopherol material in such instance was reported to comprise about 10 weight percent d-alpha-tocopherol (the tocopherol with the highest vitamin E activity), about 30 weight percent delta- tocopherol and about 60 weight percent gamma-tocopherol. The relative concentrations of the components of deodorizer distillates seems to depend on the oil or fat being treated, the type of deodorization treatment and the ways and means used to collect the distillate. In any event it is not uncommon to obtain deodorizer distillates which analyze at least about 1000 I.U. (international units) of vitamin E per pound (equivalent to a concentration of d-alpha tocopherol of about 0.2 weight percent) with some deodorizer distillates analyzing as much as 15,000 I.U. of vitamin E per pound.

In this light it would appear at first blush that deodorizer distillates could be employed in animal and poultry feeds and feed supplements as a source of vitamin E. However, deodorizer distillates as obtained do not give satisfactory results when incorporated into the usual feeds and feed supplements. The reason is that under storage conditions and in the presence of minerals and other components of the usual feeds and feed supplements the tocopherols in the deodorizer distillates are not stable. The free tocopherols apparently undergo an oxidative destruction catalyzed by the minerals and other feed components present. Hence, there is the problem of how to stablize deodorizer distillates for use in animal and poultry feeds and animal and poultry feed supplements.

A general object of this invention is to provide a practical solution to this problem.

A broad object of this invention is to provide a process for treating deodorizer distillates and the like whereby stabilized tocopherol concentrates are obtained.

A specific object of this invention is to provide a process for treating deodorizer distillates and the like to stablize the same, wherein an additive is involved, which in and of itself has nutritive value.

A specific object of this invention is to provide such a process which is practical and inherently simple and which can be practiced in conventional, readily available equipment.

These and other objects which may appear as this specification proceeds are achieved by this invention.

In summary, this invention involves a process for preparing a stabilized deodorizer distillate. This process comprises admixing polyphosphoric acid with the deodorizer distillate and preferably heating the mixture for a short period of time. The resulting product is a stable deodorizer distillate, a stable, crude, tocopherol concentrate, suitable for animal and poultry feed supplements and feeds.

One reason why stable deodorizer distillates results from the process of this invention is believed to be that the polyphosphoric acid catalyses a reaction between the free tocopherols and free fatty acids in the distillate whereby the free tocopherols are converted into tocopheryl esters. The free tocopherols in deodorizer distillates, as obtained, are in the chemical form of alcohols or phenols. In this form they are highly susceptible to oxidative attack. On the other hand esters of tocopherols are more resistant to oxidative attack and, therefore, are more stable.

Under this view polyphosphoric acid functions in the process of this invention as an esterification catalyst. In addition, in dealing with deodorizer distillates having a total tocopherols concentration of at least about 2 weight percent or analyzing at least about 1000 I.U. of vitamin E per pound, the distillates should have an acid value at least about 4 at the 2 weight percent tocopherols level and generally at least a mole weight of free fatty acids equivalent to the mole weight of free tocopherols present. If these conditions are not met, then for optimum stabilization of the deodorizer distillate sufficient fatty acid (higher, lower or both higher and lower) should be added to the distillate before or at the same time as the polyphosphoric acid is added.

Hence, this invention in its broader aspects comprises a process for preparing tocopheryl esters. Broadly, this process comprises esterifying a tocopherol with an organic acid capable of esterifying the tocopherol, by admixing said tocopherol and acid with polyphosphoric acid at a concentration at least about equal in weight to the tocopherol and preferably heating the admixture. There is no upper limit to the concentration of polyphosphoric acid in this process aspect of the invention. However, as a practical matter, the maximum concentration will usually be about 10–20 times the weight of the tocopherol.

This invention in its more specific aspects comprises a process for preparing a tocopheryl ester from a tocopherol and a higher fatty acid. By higher fatty acid is meant a monocarboxylic acid containing a nunbroken chain of at least 7 carbon atoms bonded to a carboxyl group. This process comprises forming an admixture of the tocopherol, at least a stoichiometric or molecular equivalent quantity of a higher fatty acid and polyphosphoric acid at a concentration at least about equal in weight to the tocopherol, and preferably heating the admixture.

This invention, however, is described herein for the most part in relation to an even more specific aspect thereof, that is, a process for preparing a stabilized deodorizer distillate.

Polyphosphoric acid is a commercially available chemical having the approximate formula $H_6P_4O_{13}$. It is a water-white, hygroscopic, viscous liquid. It is soluble in water, hydrating therein to ortho-phosphoric acid ($H_3PO_4$). In fact it is sometimes called 115% phosphoric acid. This chemical can be prepared by the partial hydration of phosphoric anhydride ($P_4O_{10}$) otherwise known as phosphorus pentoxide.

The quantity of polyphosphoric acid admixed with the deodorizer distillate to be stabilized depends on the degree of stabilization desired, the moisture content of the deodorizer distillate and other conditions such as time and temperature. In most cases, in order to achieve optimum stability under the tocopheryl ester view, complete esterification of the tocopherols should take place, wherefore, the quantity of polyphosphoric acid should be adequate for the complete esterification of the tocopherols by the free fatty acids in the deodorizer distillate. Because polyphosphoric acid hydrates to phosphoric acid in the presence of water, the smaller the moisture concentration of the deodorizer distillate the lesser the quantity of polyphosphoric acid that need be added to obtain complete stabilization. Generally speaking, from about 0.9 part by weight to about 1.5 parts by weight of polyphosphoric acid for each part by weight of deodorizer distillate results in substantially complete stabilization of most deodorizer distillates.

Heat is preferably applied to the admixture of deodoizer distillate and polyphosphoric acid in order to stabilize the deodorizer distillate to the desired extent in as short a time as is practical. Generally, the stabilization temperature of the admixture is established and maintained for the stabilization period in a range from about 50° C. to about 100° C. Higher and lower reaction temperatures can be employed. However, at lower temperatures it takes longer for the desired degree of stabilization to be reached while at higher temperatures there is substantial darkening and charring of the deodorizer distillate.

The period in which stabilization is accomplished is dependent on the degree of stabilization desired and on the temperature of the admixture during this period. Generally, at a temperature in a range from about 50° C. to about 100° C. stabilization is complete in a period ranging from about a quarter of an hour to about four hours.

The mixture resulting from this process is a stabilized deodorizer distillate, a stabilized crude tocopherol concentrate, useful for fortifying animal feeds. Thus, the stabilized deodorizer distillate can be diluted with water, emulsified by admixing it with an emulsifying agent and the emulsion sprayed on the feed or feed supplement. The stabilized deodorizer distillate can be diluted with animal fats, such as tallow, which are normally added to some feeds and the resulting product flaked or beaded to provide a supplement comprising fat, phosphoric acid and vitamin E. Also, the stabilized distillate can be admixed with a solid carrier, for example, calcium silicate, calcium phosphate, bone meal and the like, in such quantity as to provide a solid, free flowing, granular product.

A feature of advantage of this invention is that polyphosphoric acid in the presence of water hydrates to phosphoric acid. Water initially present in the deodorizer distillate plus water formed in the esterification reaction causes the polyphosphoric acid present in the concentrate to decompose to phosphoric acid. Hence, the product of this process has a nutritionally available phosphorous content.

This invention is further illustrated by the following examples which include examples of specific embodiments thereof. This invention is not limited to these embodiments unless otherwise indicated.

Example 1

This example illustrates the preparation according to this invention of a stabilized deodorizer distillate as well as a feed supplement containing the stabilized product.

42.5 grams of a commercial deodorizer distillate and 42.5 grams of polyphosphoric acid were added to a beaker and the mixture heated on a steam bath for one hour with stirring. The reaction mixture was then mixed with ether (400 milliliters) and water (500 milliliters) whereupon a water phase and an ether phase formed. After removal of the aqueous phase, the ether solution was washed twice with water, and then slurried with a mixture of 20 grams of finely divided calcium silicate (marketed as Microcel E by Johns-Manville) and 60 grams of a commercial mineral mixture (marketed as Delamix by Limestone Products Corporation) while the ether was evaporated. This commerical mineral mixture comprised a number of mineral elements in a calcite flour carrier. The mineral elements and their concentrations were reported to be as follows:

| Mineral element: | Weight percent |
|---|---|
| Calcium | Not less than 22.0. |
| Magnesium | Not more than 1.9. |
| Fluorine | Not more than 0.008. |
| Manganese | Not less than 6.0. |
| Iron | Not less than 2.0. |
| Iodine | Not less than 0.12. |
| Copper | Not less than 0.2. |
| Zinc | Not less than 0.006. |
| Cobalt | Not less than 0.02. |
| Boron | 0.008 |

After evaporation of the ether the test product, a gray powder, was stored for 20 weeks in an open beaker at room temperature. A saponified extract of a sample of the product taken at the end of the storage period was assayed for total tocopherols by the Emmerie-Engel assay. The recovery of tocopherol was found thereby to be 84%.

A control product was made by admixing 20 grams of the same deodorizer distillate (but untreated with polyphosphoric acid) with 10 grams of finely divided calcium silicate (Microcel E), 50 grams of the same commercial mineral mix (Delamix) and ether to form a slurry. The ether was removed from the slurry whereby a gray powder product resulted. This product was placed in an open beaker at the same time as the test product and placed beside the test product beaker for 20 weeks. At the end of this time an Emmerie-Engel assay on a saponified extract of a sample of the product showed only 17% recovery of total tocopherols.

Hence, treatment of the commercial deodorizer distillate with polyphosphoric acid resulted in an increased stability of the tocopherols content when exposed to air in the presence of minerals.

Example 2

This example is another illustration of the preparation according to this invention of a stabilized deodorizer distillate as well as a feed supplement containing the same.

To a 20 gram sample of commercial deodorizer distillate was added 20 grams polyphosphoric acid. The mixture was heated on a steam bath for one hour with stirring. Ether, 35 grams of tricalcium phosphate, 50 grams of the same commercial mineral mixture (Delamix) used in Example 1 and 2 milliliters of water were added to the mixture and then stirred to form a slurry.

The ether was then removed under vacuum while stirring the solids. The powdery fat product was then stored in an open beaker at room temperature and after 20 weeks storage assayed as in Example 1. After 20 weeks' storage, the recovery of tocopherol in this product was 92%.

A control product was made by slurrying, in ether, a 20 gram sample of the same original deodorizer distillate with 30 grams of 85% phosphoric acid, 35 grams of tricalcium phosphate and 50 grams of the same commercial mineral mixture (Delamix) and then removing the ether under vacuum as above. The control product was then stored in an open beaker at the same time as, and side by side, the test product assayed after 20 weeks' storage as in Example 1. The recovery of total tocopherol was found to be 66%.

*Example 3*

This example illustrates the preparation of a water dispersed, stabilized deodorizer distillate.

10 grams of deodorizer distillate having an acid value of 55.5 and assaying by the Emmerie-Engel method 13.2 weight percent mixed tocopherols, and 10 grams of polyphosphoric acid were mixed together in a beaker. The resulting solution was stirred while heating for one hour on a steam bath. 28 grams of polyethylene glycol 400 monolaurate, an emulsifying agent which is an ester of lauric acid and polyethylene glycol having an average molecular weight of about 400, were added with continued stirring to the reaction mixture. This mixture was diluted with 400 milliliters of water. There resulted a good dispersion which did not on standing phase out into separate layers. This dispersion was suitable for spraying onto animal and poultry feeds.

*Example 4*

This example illustrates the direct esterification of a tocopherol with palmitic acid using polyphosphoric acid as a catalyst.

8 grams of a refined gamma-tocopherol concentrate having an ultraviolet absorption E (1%, 1 cm.) (296 m$\mu$)=86.5, 5.6 grams of palmitic acid and 20 grams of polyphosphoric acid were added to a beaker and stirred together for 2 hours at a temperature of 75° C. At the end of this time the reaction mass was poured into 100 milliliters of water and extracted with ethyl ether. The ether solution was washed with water, dried over anhydrous sodium sulfate and the ether evaporated. The residue was a concentrate of gamma-tocopheryl palmitate which had an ultraviolet absorption characteristic of esterified tocopherol, to wit: E (1%, 1 cm.) (285 m$\mu$)=31.

Thus, there is provided an inherently simple and economical process for preparing tocopheryl esters of higher fatty acids. Furthermore, there is provided a practical process for preparing stabilized tocopherol concentrates directly from deodorizer distillates and the like. In addition, there are provided stabilized deodorizer distillates suitable for addition to animal feeds, which not only have vitamin E activity but also nutritionally available phosphorous.

Other advantages, features and embodiments of this invention will be apparent to those in the exercise of ordinary skill in this art upon reading the foregoing disclosure. All embodiments of this invention as well as modifications and variations thereof which embrace the spirit and essential characteristics of this invention are within the scope of the claimed subject matter unless expressly excluded by claim language.

I claim:

1. A process for increasing the stability of a deodorizer distillate, having a tocopherol content and a free fatty acid content, which comprises: admixing with said distillate a stabilizing quantity of polyphosphoric acid.

2. A process for increasing the stability of a deodorizer distillate having a tocopherol content and a free fatty acid content, which comprises: forming an admixture comprising said distillate and a stabilizing quanity of polyphosphoric acid; and establishing and maintaining for at least about a quarter of an hour the temperature of said admixture in a range from about 50° C. to about 100° C.

3. A process for preparing a stabilized deodorizer distillate, from a deodorizer distillate having a tocopherol content and a free fatty acid content, which comprises forming an admixture comprising said deodorizer distillate and polyphosphoric acid in a parts by weight ratio (polyphosphoric acid to distillate) in a range from about 0.9:1 to about 1.5:1; and establishing and maintaining for at least about a quarter of an hour the temperature of said admixture in a range from about 50° C. to about 100° C.

4. A process for preparing a stabilized deodorizer distillate from a deodorizer distillate having a tocopherol content and a free fatty acid content at least the molecular equivalent of the tocopherol content, which comprises forming an admixture comprising a deodorizer distillate and polyphosphoric acid in a parts by weight ratio (polyphosphoric acid to distillate) in a range from about 0.9:1 to about 1.5:1; and establishing and maintaining for at least about a quarter of an hour the temperature of said admixture in a range from about 50° C. to about 100° C.

5. A process for preparing a stabilized deodorizer distillate from a deodorizer distillate having a tocopherol content at a concentration of at least 2 weight percent and representing at least about 1000 international units of vitamin E, and a free fatty acid content at a concentration at least the molecular equivalent of said tocopherol content, which comprises forming an admixture comprising a deodorizer distillate and polyphosphoric acid in a parts by weight ratio (polyphosphoric acid to distillate) in a range from about 0.9:1 to about 1.5:1; and establishing and maintaining for at least about a quarter of an hour the temperature of said admixture in a range from about 50° C. to about 100° C.

6. A stable tocopherol concentrate useful for animal feeds and the like, which comprises: a stabilized deodorizer distillate prepared by forming an admixture comprising (1) a deodorizer distillate having a tocopherol content at a concentration of at least 2 weight percent and representing at least about 1000 international units of vitamin E, and a free fatty acid content at a concentration at least the molecular equivalent of said tocopherol content, and (2) polyphosphoric acid in a parts by weight ratio (polyphosphoric acid to distillate) in a range from about 0.9:1 to about 1.5:1 and establishing and maintaining for at least about a quarter of an hour the temperature of said admixture in a range from about 50° C to about 100° C.

7. A free flowing, finely divided, solid, feed supplement comprising a finely divided solid carrier in admixture with a stable tocopherol concentrate, said concentrate comprising a stabilized deodorizer distillate prepared by forming an admixture comprising (1) a deodorizer distillate having a tocopherol content at a concentration of at least 2 weight percent and representing at least about 1000 international units of vitamin E, and a free fatty acid content at a concentration at least the molecular equivalent of sad tocopherol content, and polyphosphoric acid in a parts by weight ratio (polyphosphoric acid to distillate) in a range from about 0.9:1 to about 1.5:1 and establishing and maintaining for at least about a quarter of an hour the temperature of said admixture in a range from about 50° C. to about 100° C.

8. A free flowing, finely divided, solid feed supplement comprising finely divided tricalcium phosphate in admixture with a stable tocopherol concentrate, said concentrate comprising a stabilized deodorizer distillate prepared by forming an admixture comprising (1) a deodorizer distillate having a tocopherol content at a concentration of at least 2 weight percent and representing at least about 1000 international units of vitamin E, and a free fatty acid content at a concentration of at least the molecular equivalent of said tocopherol content, and polyphosphoric acid in a parts by weight ratio (polyphosphoric acid to distillate) in a range from about 0.9:1 to 1.5:1 and establishing and maintaining for at least about a quarter of an hour the temperature of said admixture in a range from about 50° C. to about 100° C.

9. A freeflowing, finely divided, solid feed supplement comprising finely divided calcium silicate in admixture with a stable tocopherol concentrate, said concentrate comprising a stabilized deodorizer distillate prepared by forming an admixture comprising (1) a deodorizer distillate having a tocopherol content at a concentration of at least 2 weight percent and representing at least about 1000 international units of vitamin E, and a free fatty acid content at a concentration at least the molecular equivalent of said tocopherol content, and polyphosphoric acid in a parts by weight ratio (polyphosphoric acid to distillate) in a range from about 0.9:1 to about 1.5:1 and establishing and maintaining for at least about a quarter of an hour the temperature of said admixture in a range from about 50° C. to about 100° C.

10. A free flowing, finely divided, solid feed supplement comprising finely divided, mineral containing solid inorganic carrier in admixture with a stable tocopherol concentrate, said concentrate comprising a stabilized deodorizer distillate prepared by forming an admixture comprising (1) a deodorizer distillate having a tocopherol content at a concentartion of at least 2 weight percent and representing at least about 1000 international units of vitamin E, and a free fatty acid content at a concentration at least the molecular equivalent of said tocopherol content, and polyphosphoric acid in a parts by weight ratio (polyphosphoric acid to distillate) in a range from about 0.9:1 to about 1.5:1 and establishing and maintaining for at least about a quarter of an hour the temperature of said admixture in a range from about 50° C. to about 100° C.

11. A sprayable feed supplement which comprises an aqueous dispersion of a stable tocopherol concentrate comprising a stabilized deodorizer distillate prepared by forming an admixture comprising (1) a deodorizer distillate having a tocopherol content at a concentration of at least 2 weight percent and representing at least about 1000 international units of vitamin E, and a free fatty acid content at a concentration at least the molecular equivalent of said tocopherol content, and polyphosphoric acid in a parts by weight ratio (polyphosphoric acid to distillate) in a range from about 0.9:1 to about 1.5:1 and establishing and maintaining for at least about an hour the temperature of said admixture in a range from about 50° C. to about 100° C.

12. A sprayable feed supplement in the form of an aqueous dispersion which comprises: water, an emulsifying agent and a stable tocopherol concentrate, said concentrate comprising a stabilized deodorizer distillate prepared by forming an admixture of a deodorizer distillate having a tocopherol content at a concentration of at least about 2 weight percent and representing at least about 1000 international units of vitamin E, and a free fatty acid content at a concentration at least the molecular equivalent of said tocopherol content, and polyphosphoric acid in a parts by weight ratio (polyphosphoric acid to distillate) in a range from about 0.9:1 to about 1.5:1 and establishing and maintaining for at least about a quarter of an hour the temperature of said admixture in a range from about 50° C. to about 100° C.

13. A sprayable feed supplement in the form of an aqueous dispersion which comprises: water, polyethylene glycol monolaurate wherein the polyethylene glycol moiety has an average molecular weight of about 400, and a stable tocopherol concentrate, said concentrate comprising a stabilized deodorizer distillate prepared by forming an admixture of a deodorizer distillate having a tocopherol content at a concentration of at least 2 weight percent and representing at least about 1000 international units of vitamin E, and a free fatty acid content at a concentration at least the molecular equivalent of said tocopherol content, and polyphosphoric acid in a parts by weight ratio (polyphosphoric acid to distillate) in a range from about 0.9:1 to about 1.5:1 and establishing and maintaining for at least about a quarter of an hour the temperature of said admixture in a range from about 50° C. to about 100° C.

14. A process for preparing a tocopheryl ester, which comprises: forming an admixture of a tocopherol, a higher fatty acid at a concentration at least the molecular equivalent of said tocopherol, and polyphosphoric acid at a concentration at least about equal in weight to said tocopherol; and establishing and maintaining for at least about a quarter of an hour the temperature of said admixture in a range from about 50° C. to about 100° C.

References Cited by the Examiner

UNITED STATES PATENTS

| | | | |
|---|---|---|---|
| 2,349,273 | 5/44 | Baxter et al. | 260—345.5 |
| 2,349,590 | 5/44 | Hickman | 99—2 X |
| 2,822,378 | 2/58 | Bader | 260—474 |
| 2,891,864 | 6/59 | Baxter | 99—2 |

A. LOUIS MONACELL, *Primary Examiner.*